(12) United States Patent
Terwilliger et al.

(10) Patent No.: US 12,196,137 B2
(45) Date of Patent: Jan. 14, 2025

(54) GAS TURBINE ENGINE WITH ELECTRICALLY DRIVEN COMPRESSOR

(71) Applicant: RTX Corporation, Farmington, CT (US)

(72) Inventors: Neil Terwilliger, Meriden, CT (US); Lance L. Smith, West Hartford, CT (US); Neal R. Herring, East Hampton, CT (US); Christopher J. Hanlon, Sturbridge, MA (US)

(73) Assignee: RTX CORPORATION, Farmington, CT (US)

( * ) Notice: Subject to any disclaimer, the term of this patent is extended or adjusted under 35 U.S.C. 154(b) by 31 days.

(21) Appl. No.: 17/345,205

(22) Filed: Jun. 11, 2021

(65) Prior Publication Data

US 2022/0397062 A1 Dec. 15, 2022

(51) Int. Cl.
*F02C 7/32* (2006.01)
*F02C 7/141* (2006.01)
*F02C 7/18* (2006.01)

(52) U.S. Cl.
CPC ............ *F02C 7/32* (2013.01); *F02C 7/141* (2013.01); *F02C 7/18* (2013.01); *F05D 2220/323* (2013.01); *F05D 2220/76* (2013.01); *F05D 2240/12* (2013.01); *F05D 2260/211* (2013.01); *F05D 2260/213* (2013.01); *F05D 2260/232* (2013.01); *F05D 2260/606* (2013.01)

(58) Field of Classification Search
CPC .... F02C 6/08; F02C 7/32; F02C 7/143; F02C 7/08; F02C 7/10; F02C 7/18; F02C 3/13; F02C 9/18; F02C 9/52; F02K 3/075; F04D 25/0606–0666; F04D 13/06–10; F04D 25/06–0693; F01D 25/36; F01D 11/24; B64D 27/24–35; B64D 27/026; F05D 2220/3219
See application file for complete search history.

(56) References Cited

U.S. PATENT DOCUMENTS 7,513,120 B2 *   4/2009   Kupratis ................ F02C 3/113
                                                                  60/788
9,140,188 B2 *   9/2015   Kupratis ................ F02K 3/075
(Continued)

FOREIGN PATENT DOCUMENTS

EP           2631451 A1      8/2013
WO    WO-2015038768 A1 *    3/2015   ............ F01D 15/10

OTHER PUBLICATIONS

European Search Report for European Application No. 22178217.0, dated Nov. 8, 2022, 97 pages.

*Primary Examiner* — Lorne E Meade
(74) *Attorney, Agent, or Firm* — CANTOR COLBURN LLP

(57) ABSTRACT

A gas turbine engine includes a turbine section located at an engine central longitudinal axis, a combustor configured to drive rotation of the turbine with combustion products, and a compressor section coupled to the turbine section at the engine central longitudinal axis and driven by the turbine section. An auxiliary compressor is located fluidly between the compressor section and the combustor such that an airflow exiting the compressor section is directed toward the auxiliary compressor. The auxiliary compressor is driven independently from the compressor section and is configured to output the airflow toward the combustor.

11 Claims, 4 Drawing Sheets

(56) References Cited

U.S. PATENT DOCUMENTS

| | | | |
|---|---|---|---|
| 10,352,243 B2* | 7/2019 | Mizukami | F02C 7/12 |
| 11,739,694 B2* | 8/2023 | Bonnoitt | B64D 27/24 |
| | | | 60/772 |
| 2009/0133380 A1* | 5/2009 | Donnerhack | F02K 3/115 |
| | | | 60/299 |
| 2014/0196469 A1 | 7/2014 | Finney et al. | |
| 2016/0215694 A1 | 7/2016 | Brostmeyer et al. | |
| 2016/0237904 A1* | 8/2016 | Scarboro | F02C 3/04 |
| 2016/0237914 A1* | 8/2016 | Schwarz | F02K 3/06 |
| 2016/0305324 A1* | 10/2016 | Magowan | F02C 7/185 |
| 2017/0268423 A1 | 9/2017 | Schwarz | |
| 2019/0178160 A1 | 6/2019 | Jones et al. | |
| 2019/0353103 A1* | 11/2019 | Roberge | F02C 7/32 |
| 2020/0003115 A1* | 1/2020 | Jones | F02C 3/10 |
| 2020/0040848 A1* | 2/2020 | Hanrahan | F02C 3/145 |

* cited by examiner

GAS TURBINE ENGINE WITH ELECTRICALLY DRIVEN COMPRESSOR

BACKGROUND

Exemplary embodiments of the present disclosure pertain to the art of gas turbine engines, and more particularly to compression of airflow in gas turbine engines.

Gas turbine engine performance is a function of Operating Pressure Ratio (OPR), with a higher OPR being indicative of improved cycle efficiency. Several factors prevent achieving higher OPR, including compressor exit temperature (T3) limits, turbine inlet temperature (T4) limits, and engine core size.

To achieve a higher OPR, additional compressor stages of diminishing size are needed. Conventional turbofan gas turbine engines are two-spool configurations, with a low pressure spool including a low pressure compressor and a low pressure turbine that are interconnected by a low pressure shaft, and similarly a high pressure spool including a high pressure compressor and a high pressure turbine that are interconnected by a high pressure shaft. The low pressure shaft extends through an interior of the high pressure spool, thus limiting an inner diameter of the high pressure compressor. For a given flow area or inlet velocity to the high pressure compressor, this limitation may require the last stages of high pressure compressor rotors to have very small blade heights (spans) with the result that compressor performance may be dominated by clearance effects.

BRIEF DESCRIPTION

In one embodiment, a gas turbine engine includes a turbine section located at an engine central longitudinal axis, a combustor configured to drive rotation of the turbine with combustion products, and a compressor section coupled to the turbine section at the engine central longitudinal axis and driven by the turbine section. An auxiliary compressor is located fluidly between the compressor section and the combustor such that an airflow exiting the compressor section is directed toward the auxiliary compressor. The auxiliary compressor is driven independently from the compressor section and is configured to output the airflow toward the combustor.

Additionally or alternatively, in this or other embodiments an intercooler heat exchanger is located fluidly between the compressor section and the auxiliary compressor to cool the airflow exiting the compressor section.

Additionally or alternatively, in this or other embodiments an intercooler valve is operable to allow the airflow to selectably bypass the intercooler heat exchanger.

Additionally or alternatively, in this or other embodiments the airflow is cooled at the intercooler heat exchanger via thermal energy exchange with one of a bypass airflow, a RAM airflow or an airflow from another aircraft or engine system.

Additionally or alternatively, in this or other embodiments a compressor valve is operable to allow the airflow to selectably bypass the auxiliary compressor.

Additionally or alternatively, in this or other embodiments an electric motor drives the auxiliary compressor.

Additionally or alternatively, in this or other embodiments electrical energy to drive the electric motor is from a generator operably connected to the turbine section.

Additionally or alternatively, in this or other embodiments the auxiliary compressor is located remotely from the engine central longitudinal axis.

Additionally or alternatively, in this or other embodiments the turbine section includes a variable pitch vane stage.

Additionally or alternatively, in this or other embodiments the gas turbine engine includes a low pressure spool including a low pressure turbine of the turbine section and a low pressure compressor of the compressor section coupled to the low pressure turbine and driven by the low pressure turbine, and a high pressure spool including a high pressure turbine of the turbine section and a high pressure compressor of the compressor section coupled to the high pressure turbine and driven by the high pressure turbine. The auxiliary compressor is fluidly connected to an exit of the high pressure compressor between the high pressure compressor and the combustor.

Additionally or alternatively, in this or other embodiments the low pressure spool and the high pressure spool are coaxial.

In another embodiment, a method of operating a gas turbine engine includes driving rotation of a compressor section of the gas turbine engine by rotation of a turbine section of the gas turbine engine, compressing an airflow at the compressor section, further compressing the airflow at an auxiliary compressor driven independently from the compressor section, and combusting the further compressed airflow at a combustor section to drive rotation of the turbine section with the combustion products.

Additionally or alternatively, in this or other embodiments the airflow is cooled at an intercooler heat exchanger before further compressing the airflow at the auxiliary compressor.

Additionally or alternatively, in this or other embodiments the airflow is cooled at the intercooler heat exchanger via thermal energy exchange with one of a bypass airflow, a RAM airflow or an airflow from another aircraft or engine system.

Additionally or alternatively, in this or other embodiments the airflow is directed to selectably bypass one or more of the auxiliary compressor or the intercooler heat exchanger via operation of one or more valves.

Additionally or alternatively, in this or other embodiments the auxiliary compressor is driven by an electric motor.

Additionally or alternatively, in this or other embodiments electrical energy to drive the electric motor is from a generator operably connected to the turbine section.

Additionally or alternatively, in this or other embodiments the auxiliary compressor is located remotely from the engine central longitudinal axis.

Additionally or alternatively, in this or other embodiments a variable pitch vane stage is operated at the turbine section to control the airflow entering the turbine section.

Additionally or alternatively, in this or other embodiments the gas turbine engine is a two-spool gas turbine engine and the auxiliary compressor is located fluidly between a high pressure compressor section and the combustor.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
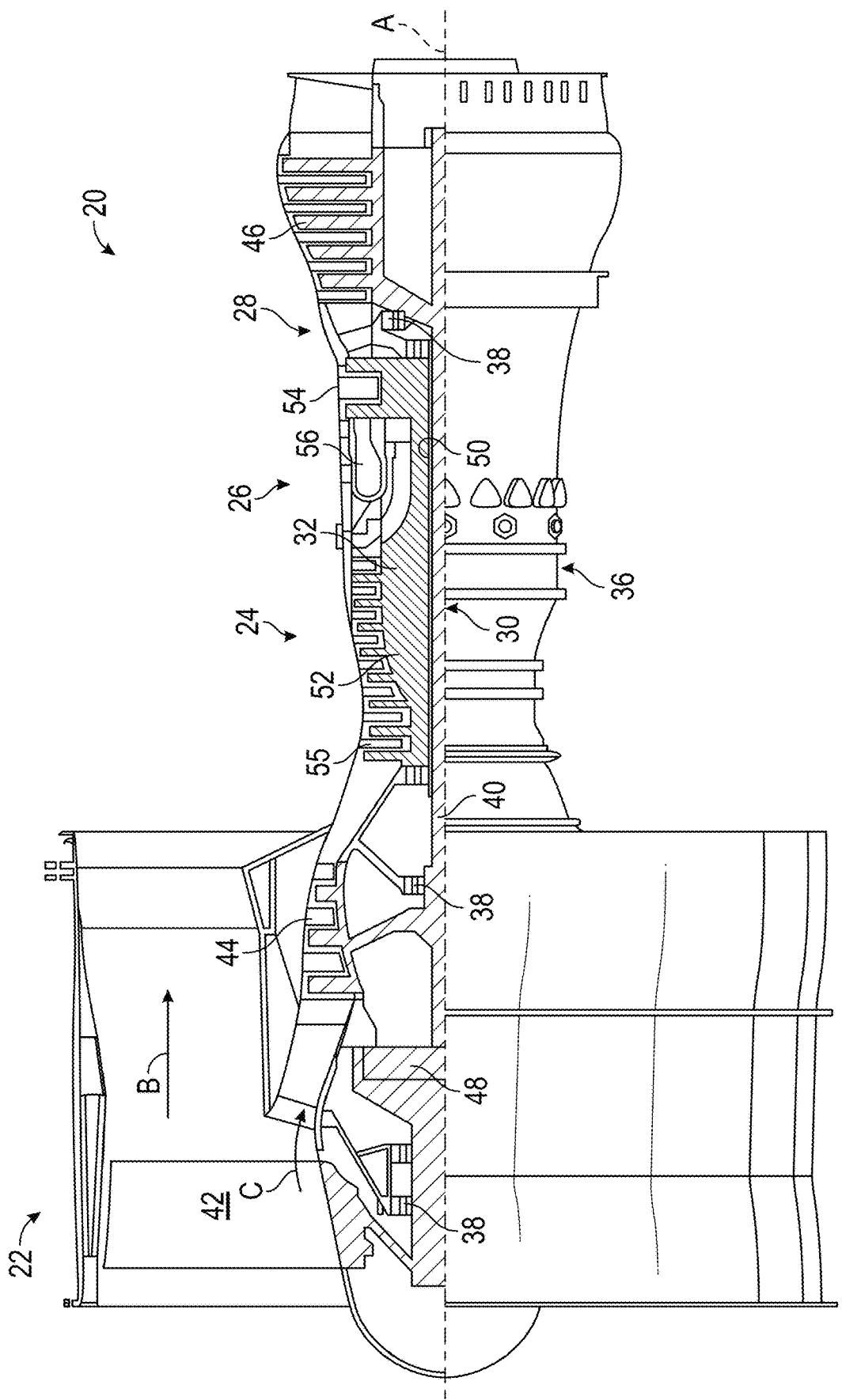
FIG. 1 is a schematic illustration of an embodiment of a gas turbine engine.

FIG. 1 schematically illustrates an embodiment of a gas turbine engine 20. The gas turbine engine 20 is disclosed herein as a two-spool turbofan that generally incorporates a fan section 22, a compressor section 24, a combustor section 26 and a turbine section 28. Alternative engines might include other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures or engines powering distributed or remote propulsors.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by 1bf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 m/sec).

Figure 2:
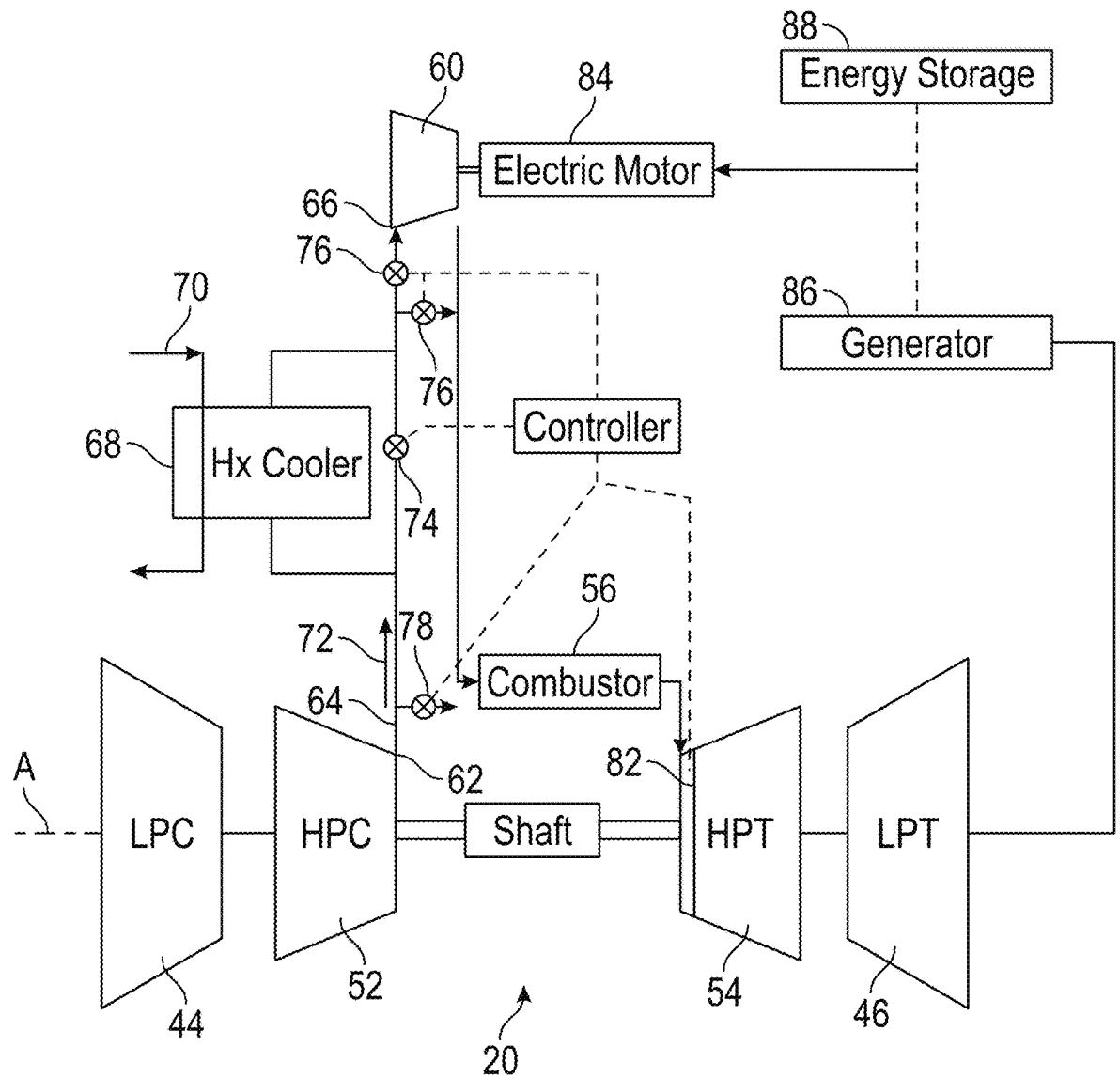
FIG. 2 is another schematic illustration of an embodiment of a gas turbine engine including an auxiliary compressor.

Referring now to FIG. 2, the gas turbine engine 20 includes additional features allowing for an increased Operating Pressure Ratio (OPR) for a given high pressure compressor 52 exit temperature (T3). An auxiliary compressor 60 is operably connected to the high pressure compressor 52, and is configured to further compress a core airflow 72 exiting the high pressure compressor 52 via a high pressure compressor outlet 62 resulting in an increased OPR compared to an engine without the auxiliary compressor. In the embodiment of FIG. 2, the auxiliary compressor 60 is located off axis relative to the high pressure compressor 52. Restated, the auxiliary compressor 60 is not located at the engine central longitudinal axis A.

A compressor pathway 64 connects the high pressure compressor outlet 62 and an auxiliary compressor inlet 66. An intercooler heat exchanger 68 is located along the compressor pathway 64 such that such that the core airflow 72 directed from the high pressure compressor 52 toward the auxiliary compressor 60 is cooled via thermal energy exchange with a cooling airflow 70 at the intercooler heat exchanger 68. The cooling airflow 70 may be, for example, directed from the bypass flow path B, may be RAM air from outside of the gas turbine engine 20, or fluid flow from another engine or aircraft system. Once passed through the auxiliary compressor 60, core airflow 72 is directed to the combustor 56 where it is combusted with fuel. The use of the intercooler heat exchanger 68 reduces the temperature of the core airflow 72 exiting the auxiliary compressor 60 thus allowing more fuel to be added into the combustor 56 to improve or raise the turbine inlet temperature T4.

One or more valves are included to allow for selectably flowing the core airflow 72 to or around components of the arrangement illustrated in FIG. 2. For example, an intercooler valve 74 is located along the compressor pathway 64 and is operable to selectably direct the core airflow 72 toward the intercooler heat exchanger 68 or to allow the core airflow 72 to bypass the intercooler heat exchanger 68. Similarly, one or more compressor valves 76 are operable to either direct the core airflow 72 to the auxiliary compressor 60 or to allow the core airflow 72 to bypass the auxiliary compressor 60 after either passing through the intercooler heat exchanger 68 or bypassing the intercooler heat exchanger 68. Alternatively, in some embodiments the auxiliary compressor 60 may be configured as a pass-through compressor, where the core airflow 72 may be selectably passed through the auxiliary compressor 60 without additional compression of the core airflow 72. Additionally a combustor valve 78 allows the core airflow 72 to be selectably directed toward the auxiliary compressor 60 or to bypass the intercooler heat exchanger 68 and the auxiliary compressor 60 entirely and flowed directly to the combustor 56 from the high pressure compressor 52. The valves 74, 76, 78 may be operably connected to an engine controller 80 to selectably operate the valves 74, 76, 78 depending on operating conditions of the gas turbine engine 20. Further, the high pressure turbine 54 may include a variable pitch vane stage 82, which is selectably operable via the engine controller 80 to condition the core airflow 72 entering the high pressure turbine 54.

The auxiliary compressor 60 is driven by an electric motor 84 operably connected to the auxiliary compressor 60. This allows for driving the auxiliary compressor 60 independently from the speed of the low speed spool 30 or the high speed spool 32. Further, the electric motor 84 may be a variable speed motor so that the rotational speed of the auxiliary compressor 60 is variable. The electrical energy used to drive the auxiliary compressor 60 may be from a power source such as an electrical generator 86 and/or energy storage 88. The electrical generator may be connected to and driven by the low pressure turbine 46 as shown in FIG. 2, or may alternatively be driven by the high pressure turbine 54.

Figure 3:
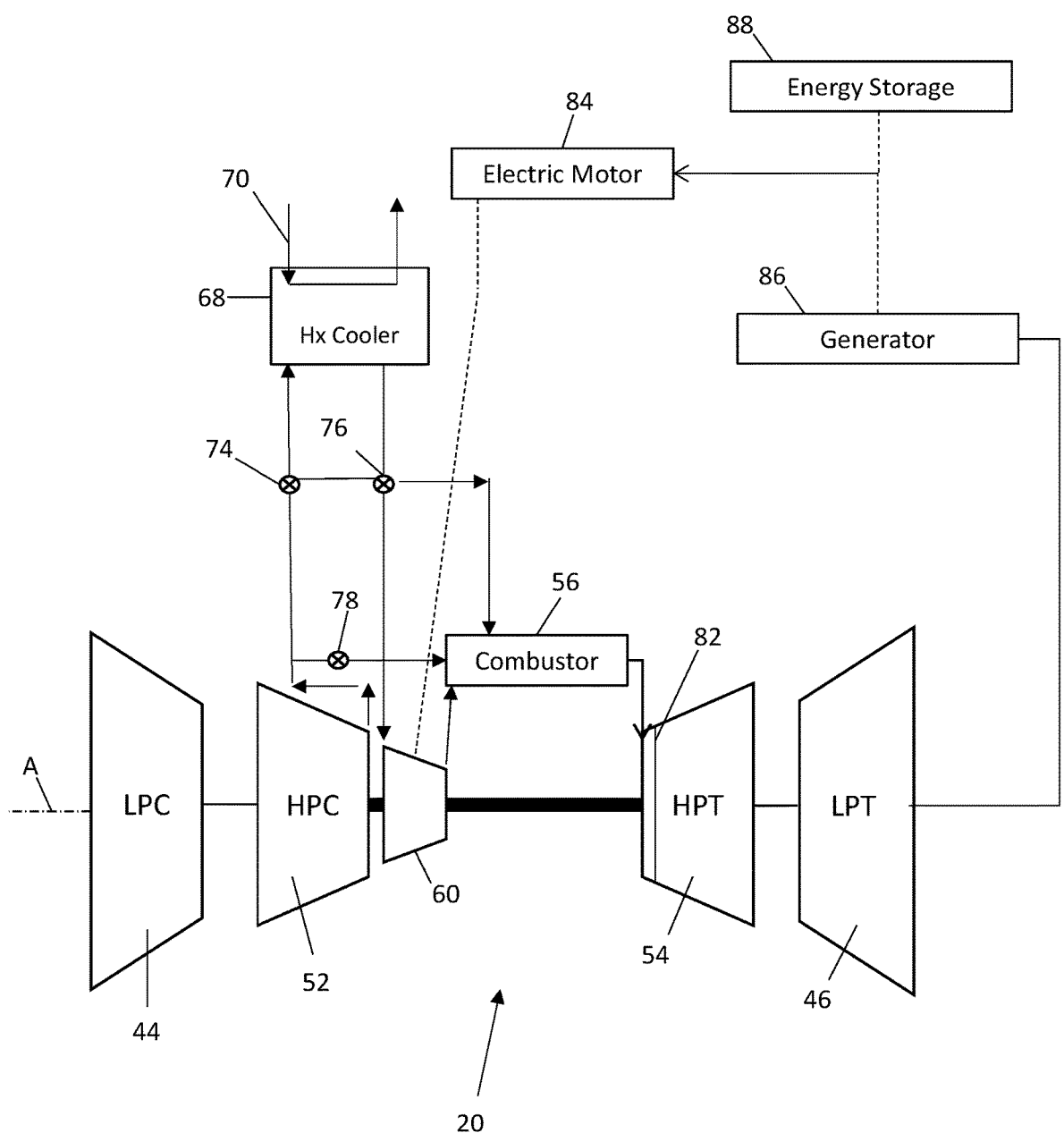
FIG. 3 is a schematic illustration of another embodiment of a gas turbine engine including an auxiliary compressor.

Referring now to FIG. 3, while in some embodiments the auxiliary compressor 60 is off-axis from the high pressure compressor 52, in other embodiments the auxiliary compressor 60 is located at the central longitudinal axis A but is independently driven about the engine central longitudinal axis A by, for example, the electric motor 84. Additionally, in such configurations the auxiliary compressor 60 may be counter rotating compared to a direction of rotation of the high pressure compressor 52. In still other embodiments, the electric motor 84 may be integrated into a casing of the gas turbine engine 20, and elements of the auxiliary compressor 60 may be part of the electric motor 84. For example, the auxiliary compressor 60 may be a tip driven configuration driven by the electric motor 84.

Figure 4:
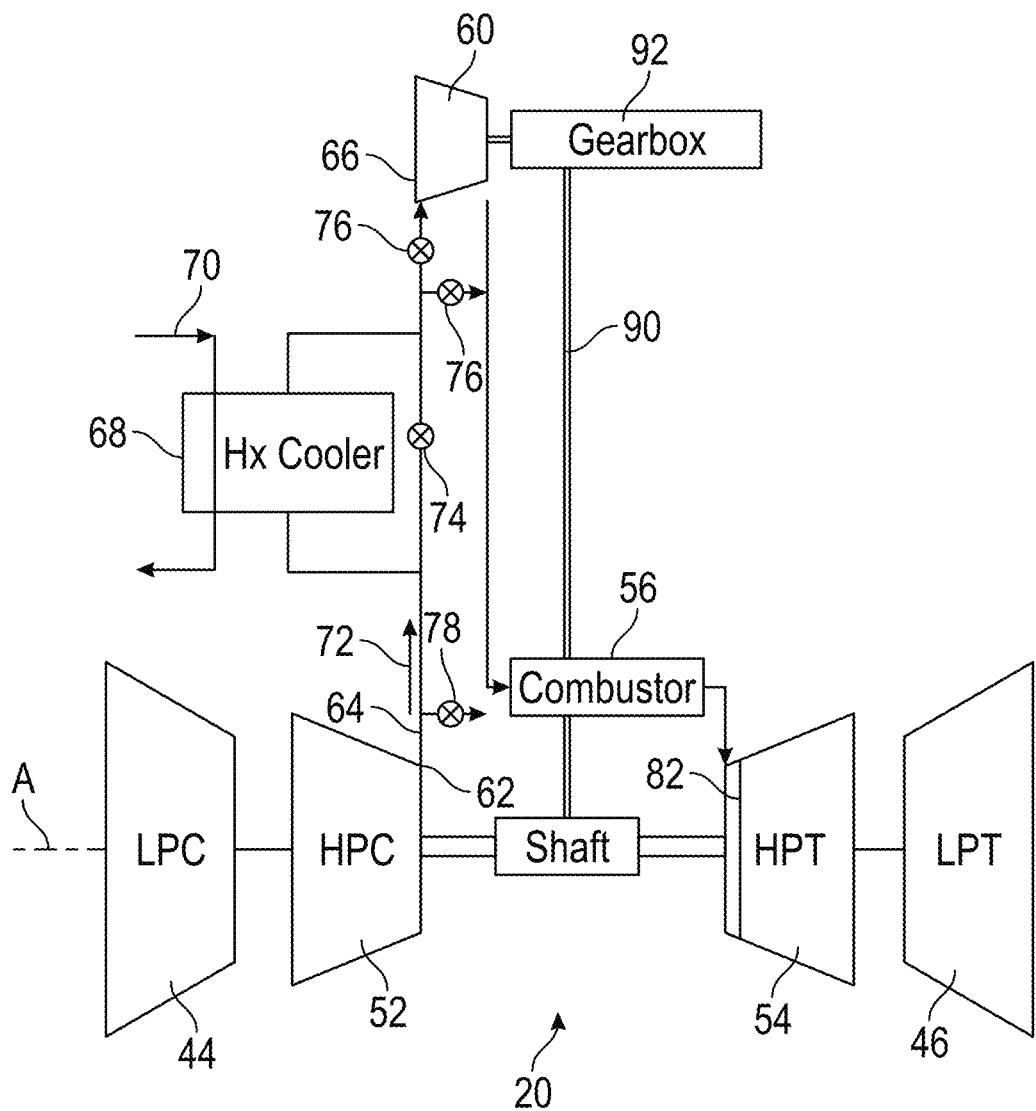
FIG. 4 is a schematic illustration of yet another embodiment of a gas turbine engine including an auxiliary compressor.

Referring now to FIG. 4, the auxiliary compressor 60 may be mechanically connected to the high speed spool 32 via a power takeoff shaft 90 to drive the auxiliary compressor 60, and further a variable differential gearbox 92 or the like may connect the power takeoff shaft 90 to the auxiliary compressor 60 to allow for a rotational speed differential between the high speed spool 32 and the auxiliary compressor 60. In other embodiments, the auxiliary compressor 60 may be independently driven by other means, such as an auxiliary turbine (not shown) connected to the auxiliary compressor 60.

The configurations disclosed herein including the auxiliary compressor 60 allow for increased OPR at a cruise operating condition without raising T3 in operating conditions such as climb or takeoff. Further, specific power can be varied relative to efficiency via selectably flowing the core airflow 72 through the intercooler heat exchanger 68. Also, the electrically driven auxiliary compressor 60 has a relatively low inertia compared to the low speed spool 30 and the high speed spool 32, and can provide on demand rapid response for operability control of the gas turbine engine 20. Additionally, since the auxiliary compressor 60 is located off of the engine central longitudinal axis A, an internal diameter of the auxiliary compressor 60 may be relatively small, allowing for longer blade lengths and smaller clearance effects.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:
1. A two-spool gas turbine engine comprising:
   a low speed spool disposed on an inner shaft, the low speed spool including:
      a low pressure compressor; and
      a low pressure turbine configured to drive the low pressure compressor;
   a high speed spool disposed on an outer shaft located radially outboard of the inner shaft, the high speed spool including:
      a high pressure compressor located downstream of the low pressure compressor; and
      a high pressure turbine located upstream of the low pressure turbine and configured to drive the high pressure compressor;
   a combustor disposed upstream of the high pressure turbine and downstream of the high pressure compres- sor, and configured to drive rotation of the high pressure turbine and the low pressure turbine with combustion products;

an auxiliary compressor disposed fluidly between the high pressure compressor and the combustor such that an airflow exiting the high pressure compressor is directed toward the auxiliary compressor, the auxiliary compressor driven independently from each of the low speed spool and the high speed spool, and configured to output the airflow toward the combustor, the auxiliary compressor rotationally uncoupled from the both the low speed spool and the high speed spool; and an electric motor, rotation of the auxiliary compressor driven only by the electric motor;

wherein the auxiliary compressor is disposed coaxially with at least one of the low speed spool and the high speed spool;

wherein the auxiliary compressor is not rotationally coupled to a corresponding turbine.

2. The gas turbine engine of claim 1, further comprising an intercooler heat exchanger disposed fluidly between the high pressure compressor and the auxiliary compressor to cool the airflow exiting the high pressure compressor.

3. The gas turbine engine of claim 2, wherein the airflow is cooled at the intercooler heat exchanger via thermal energy exchange with one of a bypass airflow, a RAM airflow or an airflow from another aircraft or engine system.

4. The gas turbine engine of claim 1, wherein electrical energy to drive the electric motor is from a generator operably connected to the low pressure turbine.

5. The gas turbine engine of claim 1, wherein the high pressure turbine includes a variable pitch vane stage.

6. The gas turbine engine of claim 1, wherein the low pressure spool and the high pressure spool are coaxial.

7. A method of operating a two spool gas turbine engine, comprising:

driving rotation of a low speed spool and a high speed spool of the gas turbine engine, the low speed spool disposed on an inner shaft and including:
a low pressure compressor; and
a low pressure turbine configured to drive the low pressure compressor;

the high speed spool disposed on an outer shaft located radially outboard of the inner shaft, and including:
a high pressure compressor located downstream of the low pressure compressor; and
a high pressure turbine located upstream of the low pressure turbine and configured to drive the high pressure compressor;

compressing an airflow at the low pressure compressor and at the high pressure compressor;

further compressing the airflow at an auxiliary compressor driven independently from each of the low speed spool and the high speed spool, the auxiliary compressor rotationally uncoupled from both of the high pressure turbine and the low pressure turbine and driven only by an electric motor;

combusting the further compressed airflow at a combustor section to drive rotation of the high speed turbine and the low speed turbine with combustion products;

wherein the auxiliary compressor is disposed coaxially with the low pressure compressor and with the high pressure compressor;

wherein the auxiliary compressor is disposed between the high pressure compressor and the combustor section;

wherein the auxiliary compressor is not rotationally coupled to a corresponding turbine.

8. The method of claim 7 further comprising cooling the airflow at an intercooler heat exchanger before further compressing the airflow at the auxiliary compressor.

9. The method of claim 8, wherein the airflow is cooled at the intercooler heat exchanger via thermal energy exchange with one of a bypass airflow, a RAM airflow or an airflow from another aircraft or engine system.

10. The method of claim 7, wherein electrical energy to drive the electric motor is from a generator operably connected to the low pressure turbine.

11. The method of claim 7 further comprising operating a variable pitch vane stage at the high pressure turbine to control the combustion products entering the high pressure turbine.

\* \* \* \* \*